UNITED STATES PATENT OFFICE.

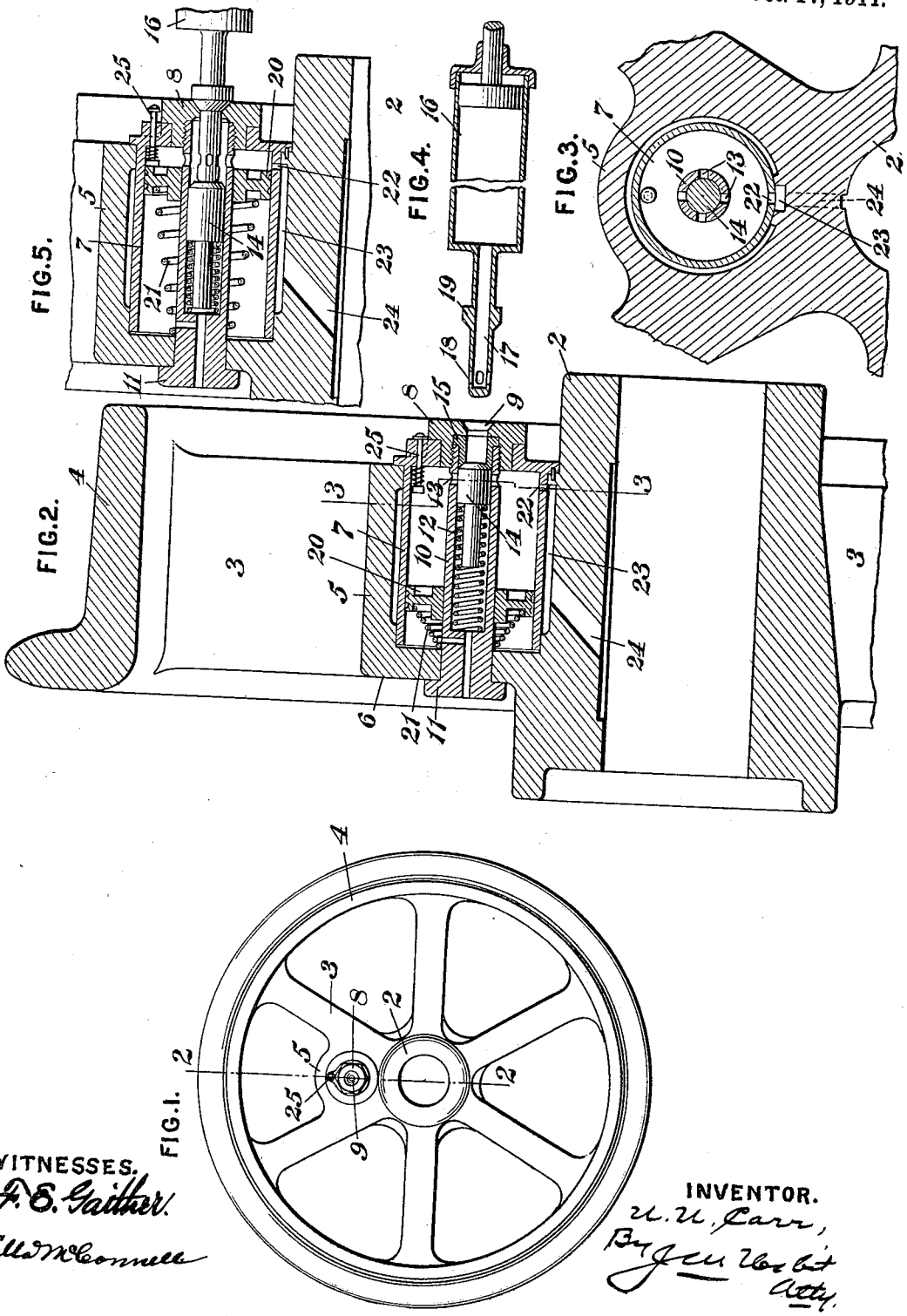
U. U. CARR.
LUBRICATOR.
APPLICATION FILED OCT. 12, 1910.
1,006,059.
Patented Oct. 17, 1911.

UHEL U. CARR, OF PITTSBURGH, PENNSYLVANIA, ASSIGNOR OF ONE-HALF TO CHARLES KARRAL, OF HORNING, PENNSYLVANIA.

LUBRICATOR.

1,006,059. Specification of Letters Patent. Patented Oct. 17, 1911.

Application filed October 12, 1910. Serial No. 586,675.

*To all whom it may concern:*

Be it known that I, UHEL U. CARR, a resident of Pittsburgh, in the county of Allegheny and State of Pennsylvania, have invented certain new and useful Improvements in Lubricators, of which the following is a specification.

This invention relates to lubricators for journal bearings, and has particular reference to the lubrication of wheels for mine cars and other uses which may be advantageously lubricated by soft grease as distinguished from oil.

The object is to provide simple and efficient means for confining the grease and for feeding it automatically to the bearing, together with efficient means for charging or filling the grease carrier.

A further purpose is to so arrange the several parts that they are readily accessible and may be easily assembled.

In the accompanying drawings the invention is shown applied to a wheel adapted for mine car use, Figure 1 being a face view of such a wheel, and Fig. 2 a section through a part of the wheel, taken on line 2—2 of Fig. 1. Fig. 3 is a cross-section through the lubricator on line 3—3 of Fig. 2. Fig. 4 is a view of a suitable form of grease injector. Fig. 5 is a longitudinal section of the lubricator shown in Fig. 1, illustrating a slight modification, and also showing the grease ejecting piston near the end of its stroke and operating a device for indicating that the chamber is nearly empty.

Referring to the drawings, 2 indicates the hub of a car wheel of usual or any preferred form, 3 the spokes thereof, and 4 the flanged rim. Between two of the spokes the wheel is formed with the recessed enlargement 5 which is open at one end, preferably the end at the front face of the wheel, and at its opposite end 6 closed save for a central bolt passage. Entered in the cavity through its open end is the cylindrical grease chamber 7, the latter preferably open at its inner end with its opposite end closed by the outwardly projecting nut 8 formed with inlet opening 9. A bolt 10, headed at one end at 11 and threaded at its opposite end, is entered through the passage in wall 6 and extends through chamber 7, with its threaded end engaged by nut 8. With the bolt head 11 engaging the exterior of enlargement 5, the grease chamber is securely held though readily removable. Bolt 10 is recessed inwardly from its threaded end, as indicated at 12, with said end in register with inlet 9, and with ports 13 opening into chamber 7. These ports are normally closed by the spring pressed valve 14 slidable within the bolt cavity. In the adaptation shown in Fig. 2, the end of valve 14 closes against gland 15 confined between nut 8 and bolt 10, while in the construction of Fig. 5 the gland is omitted and the valve closes against nut 8. The grease may be inserted by a syringe-like device 16 having spout 17 adapted to enter opening 9 and force valve 14 backward and uncover ports 13, the grease discharging through the lateral spout outlets 18 which are held in register with ports 13 by the spout enlargement 19. As the spout fits closely in gland 15, there is less space within cavity 12 for grease to accumulate than with the gland omitted as in Fig. 5, and by thus reducing the space, there is less waste as the grease which lodges therein is simply forced outward through and around opening 9 when valve 14 closes upon withdrawing spout 17.

A piston 20 slides on bolt 10 within chamber 7, being forced forwardly therein by spring 21. The spring is preferably of frusto-conical form whereby it may contract into substantially flat form as it does when the piston is moved fully backward upon forcibly charging chamber 7, thereby permitting the piston to move quite close to the chamber end and thus be completely filled. The forward movement of the piston forces the grease through port 22, channel 23, and port 24 to the wheel bore, the feed being as rapid as the grease is taken up by the bearing. Port 24 is preferably inclined toward the open end of the chambered portion 5 of the wheel so that when the cylinder 7 is removed upon the withdrawal of bolt 10, a straight bar or other punching device may be inserted through the cavity for clearing the port of any obstruction that may become lodged therein. When chamber 7 is nearly empty the advancing piston 20 engages the spring-held bolt 25 extending through the end wall of the chamber and projects said bolt, as in Fig. 5, thus indicating that the chamber requires refilling. So long as the bolt 25 is not projected it will be known that the wheel has a sufficient supply of grease.

Spring 21 may be gaged to feed the lubricant to the wheel bore at the desired rate for maintaining efficient lubrication. There is and can be no waste under proper adjustment, all of the grease discharging from the reservoir passing necessarily to the bearing. It is unnecessary to frequently replenish the reservoir as it is of sufficient capacity to hold enough grease for several days' constant running.

While the invention is here shown and described in connection with a car wheel, it is obvious that it may be utilized for lubricating a great variety of journal bearings, regardless of whether the bearing or the journal rotates, without departing from the invention.

I claim:—

1. The combination of a lubricant chamber provided with an outlet, a tubular lubricant-admitting member within the chamber and ported to communicate therewith, a self-closing valve for the tubular member, and a piston freely slidable on the tubular member for ejecting the lubricant from the chamber.

2. The combination of a lubricant chamber provided with an outlet, lubricant inlet means consisting of a tubular device within the chamber and ported to communicate therewith, an outwardly seating spring-pressed valve normally closing said communication, and a spring-pressed piston within the chamber and freely slidable on the tubular device for ejecting the lubricant.

3. The combination of a wheel having a ported hub, a removable lubricant chamber ported to register with the ported hub, a removable device for admitting lubricant to the chamber, said device adapted to engage the wheel and the chamber for holding said parts in operative relation, and a valve for said device.

4. The combination of a wheel having a journal bearing, the wheel formed with a chamber at one side of its bearing with ported communication between the latter and the chamber, a lubricant container removably entered in said chamber and ported to communicate with the latter, and lubricant ejecting means within the container.

5. The combination of a wheel formed with a cavity at one side of its hub, said cavity open at one end and closed at its opposite end, a grease chamber entered in the cavity with ports establishing communication between the chamber and the wheel bore, means securing the chamber to an end wall of said cavity, and means within the chamber for forcing grease therefrom to the wheel bore.

6. The combination of a wheel having a cavity therein adjacent the wheel hub, said cavity being open at one end and having a passage through its opposite end, a grease chamber entered in the open end of the cavity with ports placing the same in communication with the wheel bore, a headed member entered in the chamber through the passage in the wall of the recess with the head of said member engaging said wall and its opposite end engaging the chamber for holding the latter in place, and means within the chamber for forcing grease therefrom to the wheel bore.

7. The combination of a member provided with a bearing and formed with a cavity adjacent the bearing, said cavity open at one end and at its opposite end wall formed with a passage, a grease chamber entered in the cavity with ports establishing communication between the chamber and the bearing, a tubular bolt extending through said passage and engaging said wall and also engaging the chamber for holding the latter in place, the chamber having an inlet opening communicating with the interior of the bolt and the latter in ported communication with the chamber, means for closing said communication, and means within the chamber for forcing grease therefrom to the bearing.

8. The combination of a member provided with a bearing and formed with a cavity adjacent the bearing, said cavity open at one end and having a passage formed through its opposite end wall, a grease chamber entered in the cavity with ports establishing communication between the chamber and the bearing, a hollow bolt extending into and engaging the chamber for holding it in place, the hollow bolt being in communication with the grease chamber and also having a grease inlet, a spring pressed valve within the bolt and normally closing communication with the chamber, and means within the chamber for forcing grease therefrom to the bearing.

9. The combination of a wheel formed with a cavity adjacent its hub, said cavity open at one end and having a passage formed through its opposite end wall, a grease chamber entered in the cavity with ports establishing communication between the chamber and wheel bore, a bolt headed at one end and threaded at its opposite end, the bolt entered through the passage in the end wall of the cavity and extending through the chamber with its threaded end connected to the said chamber, and means within the chamber for forcing grease therefrom to the wheel bore.

10. The combination of a wheel formed with a cavity adjacent its hub, said cavity open at one end and with the passage formed through its opposite end wall, a grease chamber open at one end with its opposite end entered in the cavity with ports establishing communication between the opposite end of the chamber and the wheel bore, the end wall of the chamber opposite its open end formed with a grease inlet, a tubular bolt entered through the passage in the cavity and wall and extending through the chamber and engaging the end wall of the latter with the interior of the bolt in communication with the opening through the end wall of the grease chamber and also in communication with the interior of the chamber, a spring-pressed valve seating toward the end wall of the grease chamber and normally closing the grease inlet, a piston movable within the chamber, and a spring behind the piston for forcing it toward the closed end of the chamber.

In testimony whereof I affix my signature in presence of two witnesses.

UHEL U. CARR.

Witnesses:
J. M. NESBIT,
F. E. GAITHER.

Copies of this patent may be obtained for five cents each, by addressing the "Commissioner of Patents, Washington, D. C."